(12) United States Patent
Phelan

(10) Patent No.: US 7,744,785 B2
(45) Date of Patent: Jun. 29, 2010

(54) METHOD FOR PREPARING SILICONE HYDROGELS

(75) Inventor: John Christopher Phelan, Duluth, GA (US)

(73) Assignee: Novartis AG, Basel (CH)

( * ) Notice: Subject to any disclaimer, the term of this patent is extended or adjusted under 35 U.S.C. 154(b) by 656 days.

(21) Appl. No.: 11/638,790

(22) Filed: Dec. 14, 2006

(65) Prior Publication Data

US 2007/0132949 A1   Jun. 14, 2007

Related U.S. Application Data

(60) Provisional application No. 60/750,195, filed on Dec. 14, 2005.

(51) Int. Cl.
| | | |
|---|---|---|
| B29D 11/00 | (2006.01) | |
| B28B 11/12 | (2006.01) | |
| C08F 2/00 | (2006.01) | |
| C08F 30/08 | (2006.01) | |
| C08F 290/06 | (2006.01) | |

(52) U.S. Cl. ............... 264/1.32; 264/2.7; 264/157; 264/158; 264/159; 526/89; 526/279; 523/107

(58) Field of Classification Search ............... 264/1.32, 264/2.7, 157, 158, 159; 526/89, 279; 523/107
See application file for complete search history.

(56) References Cited

U.S. PATENT DOCUMENTS

| | | | | |
|---|---|---|---|---|
| 4,136,250 A * | 1/1979 | Mueller et al. | ............ | 528/29 |
| 4,153,641 A * | 5/1979 | Deichert et al. | ............ | 526/264 |
| 4,312,575 A | 1/1982 | Peyman et al. | ........... | 351/160 H |
| 4,444,711 A | 4/1984 | Schad | .................. | 264/243 |
| 4,460,534 A | 7/1984 | Boehm et al. | ............ | 264/246 |
| 4,632,844 A | 12/1986 | Yanagihara et al. | ............ | 427/38 |
| 5,115,056 A * | 5/1992 | Mueller et al. | ............ | 526/243 |
| 5,260,000 A * | 11/1993 | Nandu et al. | ............ | 264/2.1 |
| 5,314,960 A | 5/1994 | Spinelli et al. | ............ | 525/280 |
| 5,610,250 A | 3/1997 | Veregin et al. | ............ | 526/219.3 |
| 5,760,100 A | 6/1998 | Nicolson et al. | ............ | 523/106 |
| 5,843,346 A | 12/1998 | Morrill | ................. | 264/2.5 |
| 5,849,811 A | 12/1998 | Nicolson et al. | ............ | 523/106 |
| 5,894,002 A | 4/1999 | Boneberger et al. | ....... | 264/1.36 |
| 6,122,999 A | 9/2000 | Durazo et al. | ............ | 82/1.11 |
| 6,271,340 B1 | 8/2001 | Anderson et al. | ............ | 528/423 |
| 6,376,615 B1 | 4/2002 | Guerrero-Santos et al. | .. | 525/254 |
| 6,388,004 B1 | 5/2002 | Anderson et al. | ............ | 524/829 |
| 6,451,871 B1 | 9/2002 | Winterton et al. | ............ | 523/106 |
| 6,458,758 B1 | 10/2002 | Hsia | ....................... | 514/2 |
| 6,465,193 B2 | 10/2002 | Akeson et al. | ............ | 435/7.1 |
| 6,472,486 B2 | 10/2002 | Klaerner et al. | ............ | 526/220 |
| 6,509,428 B1 | 1/2003 | Senninger et al. | ........... | 526/220 |
| 6,559,198 B2 | 5/2003 | Novicky | ................ | 523/106 |
| 6,559,255 B2 | 5/2003 | Klaerner et al. | ............ | 526/220 |
| 6,569,967 B1 | 5/2003 | Couturier et al. | ............ | 526/193 |
| 6,632,895 B1 | 10/2003 | Melchiors et al. | ............ | 526/90 |
| 6,642,322 B2 | 11/2003 | Gagné et al. | ............ | 525/411 |
| 6,677,413 B1 * | 1/2004 | Lewandowski et al. | ..... | 526/204 |
| 6,680,362 B1 | 1/2004 | Fansler et al. | ............ | 526/217 |
| 6,686,424 B2 | 2/2004 | Detrembleur et al. | ....... | 526/211 |
| 6,692,914 B1 | 2/2004 | Klaerner et al. | ............ | 435/6 |
| 6,716,948 B1 | 4/2004 | Klaerner et al. | ........... | 526/303.1 |
| 6,719,929 B2 | 4/2004 | Winterton et al. | ............ | 264/1.7 |
| 6,734,269 B1 | 5/2004 | Buback et al. | ............ | 526/220 |
| 6,737,488 B2 | 5/2004 | Vanhoorne et al. | ........... | 526/220 |
| 6,747,104 B1 | 6/2004 | Wendland et al. | ........... | 526/146 |
| 6,753,391 B1 | 6/2004 | Lewandowski et al. | ..... | 526/146 |
| 6,762,257 B1 | 7/2004 | Lewandowski et al. | ..... | 526/146 |
| 6,765,027 B2 | 7/2004 | Holdcroft et al. | ............ | 521/27 |
| 6,784,264 B2 | 8/2004 | Lewandowski et al. | ..... | 526/204 |
| 6,784,265 B2 | 8/2004 | Fansler et al. | ............ | 526/220 |
| 6,793,973 B2 | 9/2004 | Winterton et al. | ......... | 427/393.5 |
| 6,806,320 B2 | 10/2004 | Everaerts et al. | ......... | 525/330.3 |
| 6,812,300 B2 | 11/2004 | Ohrbom et al. | ............ | 525/498 |
| 6,818,716 B2 | 11/2004 | Wendland et al. | ............ | 526/220 |
| 6,822,016 B2 | 11/2004 | McCabe et al. | ............ | 523/107 |
| 6,825,286 B2 | 11/2004 | Ohrbom et al. | ............ | 525/498 |
| 6,828,025 B2 | 12/2004 | Ali et al. | ................ | 428/402.22 |
| 6,833,276 B2 | 12/2004 | Klaerner et al. | ............ | 436/532 |
| 6,838,530 B2 | 1/2005 | Ohrbom et al. | ............ | 525/498 |
| 6,841,637 B2 | 1/2005 | Lewandowski et al. | ..... | 526/220 |
| 6,841,703 B2 | 1/2005 | Nesvadba et al. | ............ | 564/300 |
| 6,844,405 B2 | 1/2005 | Pfaendner et al. | ............ | 526/217 |
| 6,858,309 B2 | 2/2005 | Kambouris et al. | ......... | 428/447 |

(Continued)

FOREIGN PATENT DOCUMENTS

| | | |
|---|---|---|
| EP | 0 733 452 A2 | 9/1996 |
| EP | 1 197 782 A1 | 4/2002 |
| EP | 1 522 321 | 4/2005 |
| EP | 1 525 860 | 4/2005 |
| WO | WO2005/025843 A2 | 3/2005 |

(Continued)

OTHER PUBLICATIONS

International Search Report, Sep. 20, 2007.
Written Opinion of the International Searching Authority, 2007.
Query Structures, 2004.
PDMS & Acrylamide & Contact Lenses. 2004.
PDMS & IEM & Contact Lenses I, 2004.
PDMS & IIEM & Contact Lenses II, 2004.
PDMS & IIEM & Contact Lenses III, 2004.
Search VI, 2004.
Search VII, 2005.

*Primary Examiner*—Khanh Nguyen
*Assistant Examiner*—Carson Gross
(74) *Attorney, Agent, or Firm*—Jian Zhou

(57) ABSTRACT

The present invention provides a method and a formulation for consistently producing a silicone hydrogel material having relatively high oxygen permeability, relatively high ion permeability, and low modulus, and contact lenses prepared from a formulation of the invention or made of a silicone hydrogel material of the invention.

6 Claims, No Drawings

U.S. PATENT DOCUMENTS

| | | | |
|---|---|---|---|
| 6,861,103 B2 | 3/2005 | Chang et al. | 427/522 |
| 6,871,953 B1 | 3/2005 | Mandell et al. | 351/161 |
| 6,874,888 B1 | 4/2005 | Dudai | 351/162 |
| 6,881,269 B2 | 4/2005 | Matsuzawa et al. | 118/719 |
| 6,890,994 B2 | 5/2005 | Ohrbom et al. | 525/242 |
| 6,894,133 B2 | 5/2005 | Lewandowski et al. | 526/204 |
| 6,899,806 B2 | 5/2005 | Benage et al. | 208/48 AA |
| 6,906,158 B2 | 6/2005 | Tully | 526/258 |
| 6,908,952 B2 | 6/2005 | Lewandowski et al. | 522/57 |
| 6,911,510 B2 | 6/2005 | Lewandowski et al. | 526/220 |
| 6,911,511 B1 | 6/2005 | Bertin | 526/227 |
| 6,924,341 B2 | 8/2005 | Mays et al. | 526/89 |
| 6,926,965 B2 | 8/2005 | Qiu et al. | 428/411.1 |
| 2004/0004693 A1 | 1/2004 | Chrusch, Jr. et al. | 351/41 |
| 2004/0054026 A1 | 3/2004 | Kunzler et al. | 523/106 |
| 2004/0179167 A1 | 9/2004 | Dahi et al. | 351/160 |
| 2005/0013842 A1 | 1/2005 | Qiu et al. | 424/423 |
| 2005/0027031 A1 | 2/2005 | Chang et al. | 522/68 |
| 2005/0031669 A1 | 2/2005 | Shafiee et al. | 424/426 |
| 2005/0031793 A1 | 2/2005 | Moeller et al. | 427/384 |
| 2005/0033210 A1 | 2/2005 | Shahinpoor | 602/41 |
| 2005/0038219 A1 | 2/2005 | Lai et al. | 528/32 |
| 2005/0041299 A1 | 2/2005 | Gallas | 359/642 |
| 2005/0054802 A1 | 3/2005 | Lai et al. | 528/1.5 |
| 2005/0055091 A1 | 3/2005 | Lai et al. | 623/5.16 |
| 2005/0062933 A1 | 3/2005 | Perel et al. | 351/161 |
| 2005/0070661 A1 | 3/2005 | Molock | 524/556 |
| 2005/0154080 A1 | 7/2005 | McCabe et al. | 523/107 |
| 2006/0001184 A1* | 1/2006 | Phelan et al. | 264/1.32 |

FOREIGN PATENT DOCUMENTS

| | | |
|---|---|---|
| WO | WO 2005/026216 | 3/2005 |
| WO | WO 2005/031442 | 4/2005 |
| WO | WO2005/098478 A1 | 10/2005 |
| WO | WO2006/002894 A1 | 1/2006 |

* cited by examiner

METHOD FOR PREPARING SILICONE HYDROGELS

This application claims the benefit under 35 U.S.C. §119 (e) of U.S. provisional application Ser. No. 60/750,195 filed Dec. 14, 2005.

The present invention is related to a method for preparing a silicone hydrogel material. In particular, the present invention is related to a method and a formulation for consistently producing a silicone hydrogel material having relatively high oxygen permeability, relatively high ion permeability, and low modulus, and contact lenses prepared from a formulation of the invention or made of a silicone hydrogel material of the invention.

BACKGROUND OF THE INVENTION

In recent years, soft silicone hydrogel contact lenses, for example, Focus NIGHT & DAY™ and O2OPTIX™ (CIBA VISION), and PureVision™ (Bausch & Lomb) become more and more popular because of corneal health benefits provided by their high oxygen permeability and comfort. Currently available silicone Hydrogels contact lenses are typically produced according to full molding processes involving disposable molds and a polymerizable mixture including at least one hydrophilic monomer, at least one silicone-containing monomer or macromer, and a solvent. However, no made-to-order (MTO) or customized silicone hydrogel contact lenses are commercially available.

MTO or customized contact lenses can match a patient's prescription and/or have a base curve desired by the patient. But, there are at least two problems associated MTO or customized contact lenses. First, a silicone hydrogel material is generally soft and sticky. It can only be lathed at low temperature and low temperature lathing can have a relatively high operation cost. Commonly-assigned copending U.S. patent application Ser. No. 11/148,104 disclosed methods for making room-temperature lathable silicone hydrogel materials.

The second problem is the difficulty to consistently produce a room-temperature lathable silicone hydrogel material with desired physical and mechanical properties (e.g., oxygen permeability, ion permeability, elastic modulus (modulus), elongation strength, etc.). Typically, a polymer rod is first produced and then lathed to produce a MTO or customized contact lens. A polymer rod is obtained by slowly polymerizing a lens-forming material in long glass tubes under well controlled conditions (e.g., temperatures). This type of process has a number of disadvantages that are inherent to bulk polymerization. First, the polymerization is highly exothermic and reaction kinetics are highly temperature dependent. Dissipation of heat and therefore maintaining a uniform temperature in the polymerization is a challenge since there is no stirring or solvent present during the polymerization process. Control of temperature within polymerization tubes is further complicated by increases in viscosity as conversion of monomer increases. These effects can lead to uncontrolled polymerization (run away reaction) and large temperature gradients within the polymerization tube. A polymer produced during uncontrolled polymerization can have non-homogenous composition, variability in the sequence of monomers and/or macromers in the polymer chain, and/or physical defects such as cracks and voids, resulting in low yield and high production cost. As such, polymerization of a lens-forming material in a tube generally is performed very slowly at a relatively low temperature, e.g., at 45° C. A slight increase in temperature, for example, an increase of about ten degrees, would result in formation of inhomogeneous material and defects such as cracks and voids and thereby decrease dramatically the yield of polymer rods suitable for making MTO contact lenses. Furthermore, variability in the sequence of monomers and/or macromers in the polymer chain or composition can result in variation in properties such as oxygen permeability (Dk), ion permeability (IP) and mechanical strength.

Therefore, there are needs for methods for consistently preparing a silicone hydrogel material with desired properties.

SUMMARY OF THE INVENTION

The present invention, in one aspect, provides a method of making silicone-hydrogel contact lenses by directly lathing a silicone hydrogel material. The method of the invention comprises: obtaining a polymerizable fluid composition including a siloxane-containing macromer with ethylenically unsaturated group(s), a free radical initiator, and an organonitroxide, wherein ratio of percentage by weight of the organonitroxide to the radical initiator in the polymerizable fluid composition is selected to enable the polymerization fluid composition to be cured at an elevated temperature to obtain a silicone hydrogel material having a good quality; filling one or more tubes with the polymerizable fluid composition; curing the polymerizable fluid composition at the elevated temperature in the tubes to form a polymer in a form of rod which is free of cracks and voids; stripping away the tubes from the polymer; and lathing the polymer to produce the contact lenses having an oxygen permeability of at least about 40 barres, a modulus of about 1.5 MPa or less, and a water content of at least about 15% by weight when fully hydrated.

The present invention, in another aspect, provides a silicone hydrogel material, which is obtained by copolymerizing, at an elevated temperature, a polymerizable fluid composition comprising (a) at least one siloxane-containing macromer with ethylenically unsaturated group(s), (b) a free radical initiator, and (c) an organonitroxide, wherein ratio of percentage by weight of the organonitroxide to the radical initiator in the polymerizable fluid composition is selected to enable the polymerization fluid composition to be cured at an elevated temperature to obtain the silicone hydrogel material having a good quality, an oxygen permeability of at least about 40 barres and a modulus of about 1.5 MPa or less and a water content of at least about 15% by weight when fully hydrated.

The present invention, in a further aspect, provides an ophthalmic device having a copolymer material which is obtained by copolymerizing, at an elevated temperature, a polymerizable fluid composition comprising (a) at least one siloxane-containing macromer with ethylenically unsaturated group(s), (b) a radical initiator, and (c) an organonitroxide, wherein ratio of percentage by weight of the organonitroxide to the radical initiator in the polymerizable fluid composition is selected to enable the polymerization fluid composition to be cured at an elevated temperature to obtain the copolymer material which is free of cracks and voids and has an oxygen permeability of at least about 40 barres, a modulus of about 1.5 MPa or less, and a water content of at least about 15% by weight when fully hydrated and the silicone hydrogel material.

The present invention, in still a further aspect, provides a method for cast-molding of contact lenses. The method of the invention comprises: obtaining a polymerizable fluid composition including one or more polymerizable components, a free radical initiator, and an organonitroxide, wherein the polymerizable components are selected from the group consisting of a vinylic monomer, a macromer having one or more ethylenically unsaturated groups, a prepolymer with ethylenically unsaturated groups, and mixtures thereof, wherein ratio of percentage by weight of the organonitroxide to the free radical initiator in the polymerizable fluid composition is selected to enable the polymerization fluid composition to be cured at an elevated temperature to obtain a polymer material having a good quality and a reduced polymerization shrinkage; introducing the polymerizable fluid composition into a mold for making a contact lens; and polymerizing the polymerizable fluid composition in the mold to form a contact lens.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as common within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. Typically, a contact lens has an anterior surface and an opposite posterior surface and a circumferential edge where the anterior and posterior surfaces are tapered off.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

"Ocular environment", as used herein, refers to ocular fluids (e.g., tear fluid) and ocular tissue (e.g., the cornea) which may come into intimate contact with a contact lens used for vision correction, drug delivery, wound healing, eye color modification, or other ophthalmic applications.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "hydrophilic vinylic monomer", as used herein, refers to a vinylic monomer which is capable of forming a homopolymer that is water-soluble or can absorb at least 10 percent by weight water.

A "hydrophobic vinylic monomer", as used herein, refers to a vinylic monomer which is capable of forming a homopolymer that is insoluble in water and can absorb less than 10 percent by weight water.

A "macromer" refers to a medium to high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

"Molecular weight" of a polymeric material (including monomeric or macromeric materials), as used herein, refers to the number-average molecular weight unless otherwise specifically noted or unless testing conditions indicate otherwise.

A "polymer" means a material formed by polymerizing/crosslinking one or more monomers, macromers and/or oligomers.

A "photoinitiator" refers to a chemical that initiates radical crosslinking and/or polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but ore not limited to, 2,2'-azobis(2,4-dimethylpenanenitrile), 2,2'-azobis(2-methylpropanenitrile), 2,2'-azobis(2-methylbutanenitrile), peroxides such as benzoyle peroxide, and the like. Preferably, the thermal initiator is azobisisobutyronitrile (AIBN).

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment, While any suitable pigment may be employed, it is presently preferred that the pigment be heat resistant, non-toxic and insoluble in aqueous solutions.

The term "fluid" as used herein indicates that a material is capable of flowing like a liquid.

"Surface modification", as used herein, means that an article has been treated in a surface treatment process (or a surface modification process), in which, by means of contact with a vapor of liquid, and/or by means of application of an energy source (1) a coating is applied to the surface of an article, (2) chemical species are absorbed onto the surface of an article, (3) the chemical nature (e.g., electrostatic charge) of chemical groups on the surface of an article are altered, or (4) the surface properties of an article are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface treatment processes are plasma processes, in which an ionized gas is applied to the surface of an article, and LbL coating processes.

Plasma gases and processing conditions are described more fully in U.S. Pat. Nos. 4,312,575 and 4,632,844 and published U.S. Patent Application 2002/0025389, which are incorporated herein by reference. The plasma gas is preferably a mixture of lower alkanes and nitrogen, oxygen or an inert gas.

"LbL coating", as used herein, refers to a coating that is not covalently attached to an article, preferably a medical device, and is obtained through a layer-by-layer ("LbL") deposition of polyionic (or charged) and/or non-charged materials on an article. An LbL coating can be composed of one or more layers, preferably one or more bilayers.

The term "bilayer" is employed herein in a broad sense and is intended to encompass: a coating structure formed on a medical device by alternatively applying, in no particular order, one layer of a first polyionic material (or charged material) and subsequently one layer of a second polyionic material (or charged material) having charges opposite of the charges of the first polyionic material (or the charged material); or a coating structure formed on a medical device by alternatively applying, in no particular order, one layer of a first charged polymeric material and one layer of a non-charged polymeric material or a second charged polymeric material. It should be understood that the layers of the first and second coating materials (described above) may be intertwined with each other in the bilayer.

Formation of an LbL coating on an ophthalmic device may be accomplished in a number of ways, for example, as described in U.S. Pat. No. 6,451,871 (herein incorporated by reference in its entirety) and U.S. patent application publication Nos. U.S. 2001-0045676 A1, U.S. 2001-0048975 A1, and U.S. 2004-0067365 A1 (herein incorporated by reference in their entireties). One coating process embodiment involves solely dip-coating and dip-rinsing steps. Another coating process embodiment involves solely spray-coating and spray-rinsing steps. However, a number of alternatives involve various combinations of spray- and dip-coating and rinsing steps may be designed by a person having ordinary skill in the art.

An "antimicrobial agent", as used herein, refers to a chemical that is capable of decreasing or eliminating or inhibiting the growth of microorganisms such as that term is known in the art.

"Antimicrobial metals" are metals whose ions have an antimicrobial effect and which are biocompatible. Preferred antimicrobial metals include Ag, Au, Pt, Pd, Ir, Sn, Cu, Sb, Bi and Zn, with Ag being most preferred.

"Antimicrobial metal-containing nanoparticles" refer to particles having a size of less than 1 micrometer and containing at least one antimicrobial metal present in one or more of its oxidation states.

"Antimicrobial metal nanoparticles" refer to particles which is made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

"Stabilized antimicrobial metal nanoparticles" refer to antimicrobial metal nanoparticles which are stabilized by a stabilizer during their preparation. Stabilized antimicrobial metal nano-particles can be either positively charged or negatively charged or neutral, largely depending on a material (or so-called stabilizer) which is present in a solution for preparing the nano-particles and can stabilize the resultant nano-particles. A stabilizer can be any known suitable material. Exemplary stabilizers include, without limitation, positively charged polyionic materials, negatively charged polyionic materials, polymers, surfactants, salicylic acid, alcohols and the like.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3 oxygen)/(cm^2)(sec)(mm^2 Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3 oxygen)(mm)/(cm^2)(sec)(mm^2 Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where
 n'=rate of ion transport [mol/min]
 A=area of lens exposed [mm$^2$]
 D=Ionoflux Diffusion Coefficient [mm$^2$/min]
 dc=concentration difference [mol/L]
 dx=thickness of lens [mm]

The Ionoton Ion Permeability Coefficient, P, is then determined in accordance with the following equation:

$$\ln(1-2C(t)/C(0)) = -2APt/Vd$$

where:
 C(t)=concentration of sodium ions at time t in the receiving cell
 C(0)=initial concentration of sodium ions in donor cell
 A=membrane area, i.e., lens area exposed to cells
 V=volume of cell compartment (3.0 ml)
 d=average lens thickness in the area exposed
 P=permeability coefficient An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

The term "oxyperm component in a polymerizable composition" as used herein, refers to monomers, oligomers, macromers, and the like, and mixtures thereof, which are capable of polymerizing with like or unlike polymerizable materials to form a polymer which displays a relatively high rate of oxygen diffusion there through.

The term "a reduced elastic modulus" is intended to describe that the elastic modulus of a silicone hydrogel material prepared from a polymerizable fluid composition with at least one chain transfer agent is lower than, preferably at least about 20%, more preferably at least about 30%, more preferably at least about 40% lower than that of a control silicone hydrogel material prepared from a control polymerizable composition, wherein the polymerizable fluid composition is prepared by adding the chain transfer agent into the control polymerizable fluid composition.

Room temperature (or ambient temperature) is defined as 22±6° C.

The term "lathability" in reference to a material is referred to its capability to be machined into a contact lens with optical quality using typical lens lathing equipments. One gauge of lathability of a material is its predominant glass transition temperature ($T_g$). Single phase polymeric materials with one $T_g$ below room temperature (i.e., lathing temperature) are considered to be too soft for room temperature lathing whereas those with $T_g$ above room temperature (i.e., lathing temperature), preferably at least 3 degrees above room temperature, have sufficient hardness for lathing at room temperature. Microscopically multiphasic polymeric materials may display one predominant (apparently single) $T_g$ or more than one $T_g$. As long as a microscopically multiphasic polymeric material has a $T_g$ (predominant glass transition temperature) associated with the dominant phase of the material being at room temperature or above, it can be lathed into contact lenses at room temperature. "Dominant phase" is defined herein as a phase in a multiphasic material that determines the overall (bulk or working) hardness of a material.

The term "rod" refers to a cylinder cast-molded from a lens-forming material in a tube, wherein the cylinder has a length of about 1 cm or longer.

The term "button" refers to a short cylinder (with length of about 1 cm or less) cast-molded from a lens-forming material in a mold or directly cut out of a rod. In accordance with the present invention, both the opposite surfaces of a button can be flat and curved. For example, one of the two opposite surfaces of a button can be a concave curved (e.g., hemispherical) surface whereas the other surface is a convex curved (e.g., hemispherical) surface).

The term "bonnet" refers to a polymeric button cast-molded from a lens-forming material in a mold, wherein at least one of the two opposite surfaces of the bonnet has an optically finished surface corresponding to one of the anterior and posterior surfaces of a contact lens. The term "optically finished" in reference to a surface or a zone in a surface refers to a surface of a contact lens or a zone in a surface of a contact lens, wherein the surface or zone does not need to undergo further processing, e.g., such as, polishing or lathing. One could also machine lenses from pseudo bonnets. A pseudo bonnet is a part that would require lathing of both sides of the material in order to obtain a contact lens. This type of part would allow for flexibility in the design of the front and back surfaces of a lens while minimizing material losses.

The term "polymerization shrinkage or volume change" as used herein is intended to describe a process in which the volume of a polymer material obtained from polymerization of a polymerizable composition is smaller than the volume of the polymerizable composition. Polymerization shrinkage of a polymer material is preferably determined by first polymerizing a polymerizable composition in a glass tube (20 mm×300 mm), then determining the difference between the inner diameter of the tube and the diameter of a resultant rod, and then calculating the polymerization shrinkage $$\left(\frac{\text{Inner Diameter of Tube} - \text{diameter of rod}}{\text{Inner diameter of tube}}\right).$$

It is understood that other known polymerization shrinkage measurements can also be used in the invention.

The term "a reduced polymerization shrinkage" is intended to describe that polymerization shrinkage of a polymer material prepared from a polymerizable fluid composition with a free radical initiator in the presence of at least one organonitrioxide is smaller than that of a control polymer material prepared from a control polymerizable composition, wherein the polymerizable fluid composition is prepared by adding the chain transfer agent into the control polymerizable fluid composition.

The present invention is generally directed to methods for reliably producing a silicone hydrogel material, especially silicone hydrogel rods for making MTO contact lenses, with desired physical and mechanical properties. The present invention is partly based on the discovery that by adding an organonitroxide to a polymerizable fluid composition (or a lens-forming formulation or composition) in an amount to have a selected ratio of percentage by weight of the organonitroxide to the radical initiator in the polymerizable fluid composition, the polymerization fluid composition can be cured in tubes at an elevated temperature to form rods which are substantially free of defects, such as, cracks and voids) and have consistent properties (e.g., oxygen permeability, ion permeability, water content, elastic modulus, and/or elongation). It is believed that an organonitroxide can mediate a free radical polymerization. By adjusting ratio of organonitrioxide to initiator, the polymerization rate can be controlled to produce silicone hydrogel rods of high quality (substantially free of structure defects, such as cracks and voids). Further, it is believed that organonitroxide mediated polymerization can be used to achieve better control of variability in the sequence of monomers and/or macromers in the polymer chain, molecular weight, and polydispersity before gelation and for better control of branching and of molecular weight between cross-links. The resultant materials are more homogeneous and have a more controlled network microstructure and consequently more consistent material properties. Material properties such as oxygen permeability, ion permeability, and modulus play a critical role in corneal health and comfort of contact lens users. These properties depend, in part, on polymerization conditions and control of polymerization. By using such method, one can produce silicone hydrogel rods with consistent desired properties, such as, high oxygen permeability, adequate water content, high ion permeability, low modulus, etc.

The invention is also related to an improved method for cast molding of contact lenses. It has been discovered that materials produced in this invention do not undergo significant shrinkage as evidenced by polymer rod having a very snug fit in glass tubes after curing and post curing operations. As monomer is converted to polymer there is generally a polymerization shrinkage and the polymer (if in rod form) often pulls away from the polymerization tube. Shrinkage during polymerization can lead to undesirable internal stress in the final part and poor replication of mold surfaces. Therefore, the technologies described here provide a means of producing low strain materials and parts that have good replication of molding surfaces. It is believed that low shrinkage observed here might be that the high temperature curing. High temperature curing could result in a more amorphous less efficiently packed structure. Low shrinkage and material homogeneity are important factors in the production of high quality precision moldings, such as contact lenses.

The present invention, in one aspect, provides a method of making silicone-hydrogel contact lenses by directly lathing a silicone hydrogel material. The method of the invention comprises: obtaining a polymerizable fluid composition including a siloxane-containing macromer with ethylenically unsaturated group(s), a radical initiator, and an organonitroxide, wherein ratio of percentage by weight of the organonitroxide to the radical initiator in the polymerizable fluid composition is selected to enable the polymerization fluid composition to be cured at an elevated temperature to obtain a silicone hydrogel material having a good quality; filling one or more tubes with the polymerizable fluid composition; curing the polymerizable fluid composition at the elevated temperature in the tubes to form a polymer in a form of rod which is free of cracks and voids; stripping away the tubes from the polymer; and lathing the polymer to produce the contact lenses having an oxygen permeability of at least about 40 barres, a modulus of about 1.5 MPa or less, and a water content of at least about 15% by weight when fully hydrated.

A silicone hydrogel contact lens made according to a method of the invention is characterized by having an oxygen permeability of preferably at least about 50 barres, more preferably about 60 barres, even more preferably about 70 barres and a modulus of preferably less than about 1.2 MPa, even more preferably less than about 1.0 MPa.

In accordance with the present invention, a polymerizable fluid composition can be a solution, a dispersion, a solvent-free liquid, or a melt at a temperature below 60° C.

Where a polymerizable fluid composition is a solution, it can be prepared by dissolving at least one siloxane-containing macromer with ethylenically unsaturated group(s) and all other desired components in any suitable solvent known to a person skilled in the art. Examples of suitable solvents are alcohols, such as lower alkanols, for example ethanol or methanol, and furthermore carboxylic acid amides, such as dimethylformamide, dipolar aprotic solvents, such as dimethyl sulfoxide or methyl ethyl ketone, ketones, for example acetone or cyclohexanone, hydrocarbons, for example toluene, ethers, for example THF, dimethoxyethane or dioxane, and halogenated hydrocarbons, for example trichloroethane, and also mixtures of suitable solvents, for example mixtures of water with an alcohol, for example a water/ethanol or a water/methanol mixture.

Alternatively, a polymerizable fluid composition of the invention can be obtained by adding desired amounts of a radical initiator and an organonitroxide into any formulations for making soft contact lenses. Exemplary formulations include without limitation the formulation of lotrafilcon A, lotrafilcon B, etafilcon A, genfilcon A, lenefilcon A, polymacon, acquafilcon A, and balafilcon.

Where a polymerizable fluid composition is a solvent-free liquid, it can be prepared by dissolving at least one siloxane-containing macromer with ethylenically unsaturated group(s) and all other desired components in an amount of one or more blending vinylic monomers. By removing solvent from a polymerizable composition, an obtained silicone hydrogel material may not necessary to be subjected to a process in which a solvent is removed from the silicone hydrogel material so as to reduce its stickiness and/or softness and as such, the silicone hydrogel material can be directly lathed at room temperature to make contact lenses. In addition, it is discovered that by using a solvent-free polymerizable composition, one can obtain a silicone hydrogel material having relatively low level of extractable chemicals (i.e., so called extractables). Therefore, a costly extraction process may not be needed in the production of contact lenses with a silicone hydrogel material prepared from a solvent-free polymerizable composition.

In accordance with the invention, a "blending vinylic monomer" refers to a vinylic monomer which can function both as a solvent to dissolve both hydrophilic and hydrophobic components of a polymerizable composition of the invention and as one of polymerizable components to be polymerized to form a silicone hydrogel material. Preferably, the blending vinylic monomer is present in the polymerizable composition in an amount of from about 5% to about 30% by weight.

Any suitable vinylic monomers, capable of dissolving both hydrophilic and hydrophobic components of a polymerizable composition of the invention to form a solution, can be used in the invention. Preferred examples of blending vinylic monomers include, without limitation, aromatic vinylic monomers, cycloalkyl-containing vinylic monomers. Those preferred blending monomers can increase the predominant glass transition temperature of a silicone hydrogel material prepared by curing a polymerizable composition containing those preferred blending monomer.

Examples of preferred aromatic vinylic monomers include styrene, 2,4,6-trimethylstyrene (TMS), t-butyl styrene (TBS), 2,3,4,5,6-pentafluorostyrene, benzylmethacrylate, divinylbenzene, and 2-vinylnaphthalene. Of these monomers, a styrene-containing monomer is preferred. A styrene-containing monomer is defined herein to be a monomer that contains a vinyl group bonded directly to a phenyl group in which the phenyl group can be substituted by other than a fused ring, e.g., as above with one to three $C_1$-$C_6$ alkyl groups. Styrene itself [$H_2C=CH-C_6H_5$] is a particularly preferred styrene-containing monomer.

A cycloalkyl-containing vinylic monomer is defined herein to be a vinylic monomer containing a cycloalkyl which can be substituted by up to three $C_1$-$C_6$ alkyl groups. Preferred cycloalkyl-containing vinylic monomers include, without limitation, acrylates and methacrylates each comprising a cyclopentyl or cyclohexyl or cycloheptyl, which can be substituted by up to 3 $C_1$-$C_6$ alkyl groups. Examples of preferred cycloalkyl-containing vinylic monomers include isobornylmethacrylate, isobornylacrylate, cyclohexylmethacrylate, cyclohexylacrylate, and the like.

In accordance with the present invention, one or more of acrylic acid, $C_1$-$C_{10}$ alkyl methacrylate (e.g., methylmethacrylate, ethylmethacrylate, propylmethacrylate, isopropylmethacrylate, t-butylmethacrylate, neopentyl methacrylate, methacrylonitrile, acrylonitrile, $C_1$-$C_{10}$ alkyl acrylate, N-isopropyl acrylamide, 2-vinylpyridine, and 4-vinylpyridine can be used as blending vinylic monomers. They can also be used together with an aromatic vinylic monomer or a cycloalkyl-containing vinylic monomer. Each of these blending vinylic monomer is capable of forming a homopolymer with a glass transition temperature of above 30° C. As such, by using one or more of these blending monomers one can increase the predominant glass transition temperature of a silicone hydrogel material prepared by curing a polymerizable composition containing those preferred blending monomers.

In accordance with the present invention, any know suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

Radical initiators are materials well known for use in the polymerization art to promote, and/or increase the rate of, the polymerization reaction. In accordance with the invention, a radical initiator can be a photoinitiator or preferably a thermal initiator.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Examples of suitable thermal initiators include, but are not limited to, 2,2'-azobis(2,4-dimethylpentanenitrile), 2,2'-azo-bis(2-methylpropanenitrile), 2,2'-azobis(2-methylbutanenitrile), azobisisobutyronitrile (AIBN), peroxides such as benzoyl peroxide, and the like. Preferably, the thermal initiator is 2,2'-azo-bis(2,4-dimethylvaleronitrile) (VAZO-52).

An organonitroxide is a compound having the formula of

in which $R_1$, and $R_2$ are independently H, an alkyl group, a cycloalkyl group, an arenyl group, a heterocyclic group, or an aryl group; $R_3$ is an alkyl group, a cycloalkyl group, an arenyl group, a heterocyclic group, or an aryl group; $R_3$ and $R_2$ or $R_1$ and $R_2$ may be joined together to form a cyclic ring structure that may have fused with it another saturated or aromatic ring; each of $R_1$, $R_2$, or $R_3$ may be substituted by at least one member of the group consisting of hydroxyl group, sulfonate group, sulfate group, carboxylate group, amino group, ammonium group, alkoxy group, aryloxy group, silyl group, boryl group, phosphino group, thio group, seleno group, and combinations thereof. Examples of preferred organonitroxide includes without limitation 2,2,6,6-tetramethylpiperidinoxy (TEMPO), 4-oxo-2,2,6,6-tetramethyl-1-piperidine N-oxide (4-oxo-TEMPO), 4-hydroxy-1-oxyl-2,2,6,6-tetramethylpiperidine (4-hydroxy-TEMPO).

In accordance with the invention, a polymerizable fluid composition comprises from about 0.05% to about 3%, preferably from about 0.1% to about 2%, more preferably from about 0.2% to about 1.0%, even more preferably from about 0.25% to about 0.7% by weight of a radical initiator.

In accordance with the invention, ratio of percentage by weight of the organonitroxide to the radical initiator in the polymerizable fluid composition is from about 0.2 to about 1.5, preferably from about 0.3 to about 1.1, even more preferably from about 0.4 to about 0.9. With a proper ratio of percentage by weight of the organonitroxide to the radical initiator in the polymerizable fluid composition, polymer rods can be prepared by curing at an elevated temperature to have a good quality (i.e., without substantial structure defects, such as cracks and voids). The resultant polymer rods can further have more consistent properties, such as, oxygen permeability, ion permeability, water content, modulus, elongation, or mixture thereof. In particular, oxygen permeability and ion permeability of polymer rods can be enhanced.

Polymerization (curing) may be initiated by a number of well known techniques, which, depending on the polymerizable material, may include application of radiation such as microwave, thermal, e-beam and ultraviolet. A preferred method of initiating polymerization is by heating (i.e., thermal curing).

As used herein, the term "an elevated temperature" refers to a temperature of about 55° C. or above, preferably about 60° C. or above, more preferably about 70° C. or above, even more preferably about 80° C. or above.

The term "curing at an elevated temperature" as used herein is intended to describe a process in which a polymerizable fluid composition is solidified, i.e., changing from liquid state to a solidified state (gel), at the elevated temperature. This term is not intended to describe a post-curing process in which a gel is further solidified by polymerizing residual polymerizable component in the gel.

In accordance with the present invention, a polymerizable fluid composition can also comprise siloxane-containing monomer. Any known suitable siloxane-containing monomers can be used in the present invention. Exemplary siloxane-containing monomers include, without limitation, methacryloxyalkylsiloxanes, tristrimethylsilyloxysilylpropyl methacrylate (TRIS), 3-methacryloxy propylpentamethyldisiloxane and bis(methacryloxypropyl)-tetramethyldisiloxane. A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane.

In accordance with the present invention, a polymerizable fluid composition can also comprise a hydrophilic monomer. Nearly any hydrophilic monomer that can act as a plasticizer can be used in the fluid composition of the invention. Suitable hydrophilic monomers are, without this being an exhaustive list, hydroxyl-substituted lower alkyl($C_1$ to $C_8$) acrylates and methacrylates, acrylamide, methacrylamide, (lower allyl) acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol and the like.

Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A polymerizable fluid composition can also comprise a hydrophobic monomer. By incorporating a certain amount of hydrophobic monomer in a polymerizable fluid composition, the mechanical properties (e.g., modulus of elasticity) of the resultant polymer may be improved. Examples of suitable hydrophobic vinylic comonomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, tris-trimethylsilyloxy-silyl-propyl methacrylate, 3-methacryloxypropyl-pentamethyl-disiloxane and bis(methacryloxypropyl)-tetramethyl-disiloxane. TRIS, which may act both to increase oxygen permeability and to improve the modulus of elasticity, is a particularly preferred hydrophobic monomer.

A polymerizable fluid composition can further comprise an antimicrobial agent, preferably antimicrobial metal nanoparticles, more preferably silver nanoparticles.

A polymerization fluid composition can comprise a chain transfer agent. Any chain transfer agent can be used. Examples of preferred chain transfer agent include without limitation mercaptans (e.g., 2-mercaptoethanol), alkane-thiols (e.g., ethanethiol, propanethiol, butanethiol), arylthiols (e.g., thiophenol), disulfide (e.g., di-n-butyl disulfide), carbon tetrabromide, carbon tetrachloride, chloroform, amines (e.g., ethylamine, diethylamine, triethylamine, butylamine, di and tri-butylamine), methanol, ethanol, propanol, and isopropanol, acetic acid, and acetone. Preferably, a mercaptan is the chain transfer agent.

In accordance with the present invention, a polymerizable fluid composition can further comprise various components, such as cross-linking agents, initiator, UV-absorbers, fillers, visibility tinting agents (e.g., dyes, pigments, or mixtures thereof), and the like.

Cross-linking agents may be used to improve structural integrity and mechanical strength. Examples of cross-linking agents include without limitation allyl(meth)acrylate, lower alkylene glycol di(meth)acrylate, poly lower alkylene glycol di(meth)acrylate, lower alkylene di(meth)acrylate, divinyl ether, divinyl sulfone, di- or trivinylbenzene, trimethylolpropane tri(meth)acrylate, pentaerythritol tetra(meth)acrylate, bisphenol A di(meth)acrylate, methylenebis(meth)acrylamide, triallyl phthalate or diallyl phthalate. A preferred cross-linking agent is ethylene glycol dimethacrylate (EGDMA).

The amount of a cross-linking agent used is expressed in the weight content with respect to the total polymer and is preferably in the range from 0.05 to 5%, and more preferably in the range from 0.1 to 2%. Di-functional macromer (e.g. betacon) can be used as both a cross-linker and a material to enhance Dk. In such cases this material will be comprise from about 20 to 46 weight percent of the total formulation.

In accordance with the present invention, the polymerizable fluid composition can further have one or more Tg-enhancing vinylic monomers selected from the group consisting of acrylic acid, $C_1$-$C_4$ alkyl methacrylate (e.g., methylmethacrylate, ethylmethacrylate, propylmethacrylate, isopropylmethacrylate, t-butylmethacrylate), methacrylonitrile, acrylonitrile, $C_1$-$C_4$ alkyl acrylate, N-isopropyl acrylamide, 2-vinylpyridine, and 4-vinylpyridine. It is understood that aromatic monomers and/or cycloalkyl-containing vinylic monomers can be replaced by one or more of the above Tg-enhancing vinylic monomers.

In a preferred embodiment, a polymerizable fluid composition suitable for making an ophthalmic device will include (a) from about 20% to about 46% by weight of a siloxane-containing macromer with ethylenically unsaturated group(s), (b) from about 5% to 30% by weight of a siloxane-containing monomer, (c) from about 10% to 35% by weight of a hydrophilic monomer, (d) from about 0.2% to about 1.0% by weight of a radical initiator, and (e) an amount of organonitrioxide sufficient to have a ratio of percentage by weight of the organonitrioxide to the radical initiator in the polymerizable fluid composition be from about 0.3 to about 1.1. More preferably, the siloxane-containing monomer is TRIS.

In another preferred embodiment, a solvent-free polymerizable composition of the invention comprises: from about 20% to about 46% by weight of a siloxane-containing macromer with ethylenically unsaturated group(s); from about 10% to about 30% by weight of a siloxane-containing vinylic monomer; from about 15% to about 50% by weight of a hydrophilic vinylic monomer; about 5% to about 20% by weight of a blending vinylic monomer; from about 0.2% to about 1.0% by weight of a radical initiator; and an amount of an organonitrioxide sufficient to have a ratio of percentage by weight of the organonitrioxide to the radical initiator in the polymerizable fluid composition be from about 0.3 to about 1.1.

In another preferred embodiment, a polymerizable composition of the invention comprises: from about 20% to about 46% by weight of a siloxane-containing macromer with ethylenically unsaturated group(s); from about 10% to about 30% by weight of a siloxane-containing vinylic monomer; from about 15% to about 50% by weight of a hydrophilic vinylic monomer; from about 5% to about 20% by weight of an aromatic vinylic monomer, a cycloalkylmethacrylate or a cycloalkylacrylate; from about 0.2% to about 1.0% by weight of a radical initiator; and an amount of an organonitrioxide sufficient to have a ratio of percentage by weight of the organonitrioxide to the radical initiator in the polymerizable fluid composition be from about 0.3 to about 1.1.

In another preferred embodiment, a polymerizable fluid composition further comprises at least one antimicrobial agent, preferably silver nanoparticles in an amount sufficient to impart to the resultant silicone hydrogel material an antimicrobial activity characterized by having at least a 5-fold reduction ($\geq$80% inhibition), preferably at least a 1-log reduction ($\geq$90% inhibition), more preferably at least a 2-log reduction ($\geq$99% inhibition), of viable microorganisms (e.g., *Pseudomonas aeruginosa* GSU #3, or *Staphylococcus aureus* ATCC #6538), preferably by having a prolong antimicrobial activity (i.e., effective antimicrobial activity after direct contact with a body fluid over an extended period of time). Antimicrobial activity can be determined according to procedure described in the Examples of U.S. patent application Ser. No. 10/891,407 filed on Jul. 14, 2004 (herein incorporated by reference in its entirety).

As used herein, a "prolong antimicrobial activity" is characterized by having at least a 5-fold reduction ($\geq$80% inhibition), preferably at least a 1-log reduction ($\geq$90% inhibition), more preferably at least a 2-log reduction ($\geq$99% inhibition), of viable microorganisms (e.g., *Pseudomonas aeruginosa* GSU #3, or *Staphylococcus aureus* ATCC #6538) after at least 5, preferably at least 10, more preferably at least 20, even more preferably at least 30 consecutive soaking/rinsing cycles, each cycle comprising soaking/rinsing one lens in a phosphate buffered saline (PBS) for a period of time from about 24 to about 72 hours, as shown in the Examples of U.S. patent application Ser. No. 10/891,407 filed on Jul. 14, 2004 (herein incorporated by reference in its entirety).

The present invention, in another aspect, provides a silicone hydrogel material, which is obtained by copolymerizing, at an elevated temperature, a polymerizable fluid composition comprising (a) at least one siloxane-containing macromer with ethylenically unsaturated group(s), (b) a radical initiator, and (c) an organonitrioxide, wherein ratio of percentage by weight of the organonitrioxide to the radical initiator in the polymerizable fluid composition is selected to enable the polymerization fluid composition to be cured at an elevated temperature to obtain the silicone hydrogel material having a good quality, an oxygen permeability of at least about 40 barres and a modulus of about 1.5 MPa or less and a water content of at least about 15% by weight when fully hydrated.

Any silicone or siloxane-containing vinylic monomers, siloxane-containing polymerizable macromers, organonitrioxide, hydrophilic vinylic monomers, blending vinylic monomers, Tg-enhancing vinylic monomers, aromatic vinylic monomers, cycloalkyl-containing vinylic monomers, cross-linking agents, hydrophobic vinylic monomers, free radical initiator, UV-absorbers, fillers, visibility tinting agents, antimicrobial agents, and polymerizing (curing) techniques described above can be used in this aspect of the invention.

A silicone hydrogel material of the invention has an oxygen permeability of preferably at least about 50 barrers, more preferably at least about 65 barrers, even more preferably at least about 80 barrers. In accordance with the invention, an oxygen permeability is an apparent (directly measured when testing a sample with a thickness of about 100 microns) oxygen permeability according to procedures described in Examples.

A silicone hydrogel material of the invention has a elastic modulus of about 1.5 MPa or less, preferably about 1.2 MPa or less, more preferably about 1.0 or less, even more preferably from about 0.4 MPa to about 1.0 MPa.

A silicone hydrogel material of the invention has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A silicone hydrogel material of the invention has a water content of preferably from about 18% to about 55%, more preferably from about 20% to about 38% by weight when fully hydrated. The water content of a silicone hydrogel material or a lens can be measured according to Bulk Technique as disclosed in U.S. Pat. No. 5,849,811.

A silicone hydrogel material of the invention can find use in production of ophthalmic devices, preferably contact lenses, more preferably MTO or customized contact lenses.

A silicone hydrogel material of the invention can further have a predominant glass-transition temperature of about 25° C. or higher, preferably about 30° C. or higher, more preferably about 35° C. or higher, even more preferably about 45° C. or higher.

A silicone hydrogel material of the invention can further comprise at least one antimicrobial agent, preferably silver nanoparticles in an amount sufficient to impart to the silicone hydrogel material an antimicrobial activity characterized by having at least a 5-fold reduction ($\geq$80% inhibition), preferably at least a 1-log reduction ($\geq$90% inhibition), more preferably at least a 2-log reduction ($\geq$99% inhibition), of viable microorganisms (e.g., *Pseudomonas aeruginosa* GSU #3, or *Staphylococcus aureus* ATCC #6538), preferably by having a prolong antimicrobial activity (i.e., effective antimicrobial activity after direct contact with a body fluid over an extended period of time). Antimicrobial activity can be determined according to procedure described in the Examples of U.S. patent application Ser. No. 10/891,407 filed on Jul. 14, 2004 (herein incorporated by reference in its entirety).

The present invention, in a further aspect, provides an ophthalmic device having a copolymer material which is obtained by copolymerizing, at an elevated temperature, a polymerizable fluid composition comprising (a) at least one siloxane-containing macromer with ethylenically unsaturated group(s), (b) a radical initiator, and (c) an organonitroxide, wherein ratio of percentage by weight of the organonitroxide to the radical initiator in the polymerizable fluid composition is selected to enable the polymerization fluid composition to be cured at an elevated temperature to obtain the copolymer material which is free of cracks and voids and has an oxygen permeability of at least about 40 barres, a modulus of about 1.5 MPa or less, and a water content of at least about 15% by weight when fully hydrated and the silicon hydrogel material.

Above described various embodiments and preferred embodiments of a polymerizable fluid composition and a method for making a silicone hydrogel material of the invention can be used in this aspect of the invention.

An ophthalmic device of the invention preferably is a contact lens.

A contact lens of the invention has an oxygen permeability of preferably at least about 50 barrers, more preferably at least about 65 barrers, even more preferably at least about 80 barrers. In accordance with the invention, an oxygen permeability is an apparent (directly measured when testing a sample with a thickness of about 100 microns) oxygen permeability according to procedures described in Examples.

A contact lens of the invention has a elastic modulus of about 1.5 MPa or less, preferably about 1.2 MPa or less, more preferably about 1.0 or less, even more preferably from about 0.4 MPa to about 1.0 MPa.

A contact lens of the invention further has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A contact lens of the invention further has a water content of preferably from about 18% to about 55%, more preferably from about 20% to about 38% by weight when fully hydrated. The water content of a silicone hydrogel contact lens can be measured according to Bulk Technique as disclosed in U.S. Pat. No. 5,849,811.

A contact lens of the invention further comprises at least one antimicrobial agent, preferably silver nanoparticles in an amount sufficient to impart to the silicone hydrogel material an antimicrobial activity characterized by having at least a 5-fold reduction ($\geq$80% inhibition), preferably at least a 1-log reduction ($\geq$90% inhibition), more preferably at least a 2-log reduction ($\geq$99% inhibition), of viable microorganisms (e.g., *Pseudomonas aeruginosa* GSU #3, or *Staphylococcus aureus* ATCC #6538), preferably by having a prolong antimicrobial activity (i.e., effective antimicrobial activity after direct contact with a body fluid over an extended period of time). Antimicrobial activity can be determined according to procedure described in the Examples of U.S. patent application Ser. No. 10/891,407 filed on Jul. 14, 2004 (herein incorporated by reference in its entirety).

An ophthalmic device of the invention can be made according to any known suitable methods, such as, double-sided molding processes, cast-molding processes, lathing, and combinations thereof.

Where an ophthalmic device of the invention is a contact lens, in particular a MTO or customized contact lens, one can lathe directly at room temperature a rod, preferably a button, more preferably a bonnet of a silicone hydrogel material into the ophthalmic device. Any known suitable lathe apparatus can be used in this invention. Preferably, a computer controllable (or numerically controlled) lathe is used in the invention. More preferably, a numerically controlled two-axis lathe with a 45° piezo cutter or a lathe apparatus disclosed by Durazo and Morgan in U.S. Pat. No. 6,122,999, herein incorporated by reference in its entirety, is used in the invention. Exemplary preferred lathe apparatus include without limitation numerically controlled lathes from Precitech, Inc., for example, such as Optoform ultra-precision lathes (models 30, 40, 50 and 80) having Variform piezo-ceramic fast tool servo attachment. A person skilled in the art will know how to prepare rods, buttons, and bonnets. For example, a rod can be produced preferably by thermally curing a polymerizable composition of the invention in a tube made of plastic or glass or quartz. The resultant rod optionally can be subjected to a post-curing treatment as described in the copending U.S. patent application, entitled "Method for Lathing Silicone Hydrogel Lenses", herein incorporated by reference in its entirety. The diameter of a tube used in the preparation is larger than the diameter of the contact lens. A rod can be further cut into buttons prior to lathing. However, it should be noted that it is possible for a tube diameter to be smaller than a wet lens diameter. Lens formulations that contain hydrophilic monomers usually have diameters which are larger in a hydrated state as compared to a dry state.

A person skilled in the art knows how to make molds for cast-molding or spin-casting polymer buttons. Preferably, a mold can be used to cast mold buttons, the two opposite surfaces of each of which are curved. For example, one of the two opposite surfaces of a button can be a concave curved (e.g., hemispherical) surface whereas the other surface is a convex curved (e.g., hemispherical) surface. Advantage of cast-molding buttons with two opposite curved surfaces is that less silicone hydrogel material is cut away and therefore wasted. The two curved surfaces of a button can have identical or different curvatures. Preferably, the two curved surfaces are spherical. One could also produce a button with one flat surface and one curved surface.

Where a contact lens (e.g., toric or translating multifocal lens) requires orientation and/or translation features, it would be advantageous that the entire posterior surface and a target geometry, common to all contact lenses and outside of the optical zone, of the anterior surface of a contact lens can be formed by curing a polymerizable composition in a mold for making a bonnet while lathing of a bonnet could be reduced to the finish cuts defining any desired optical zone geometry of the anterior surface of a contact lens while directly molding. As such, time, cost and material waste associated with the production of customized or made-to-order (MTO) contact lenses can be minimized. Customized or made-to-order (MTO) contact lenses can be made to match exactly to any patient's prescription. Such method is described in detail in the copending U.S. patent application entitled "Method for Lathing Silicone Hydrogel Lenses", herein incorporated by reference in its entirety. A mold for making such bonnets includes a first mold half having a first molding surface with optical quality and a second mold half having a second molding surface, wherein the second molding surface has a substantially-annular peripheral molding zone with optical quality, wherein the first molding surface defines the posterior surface of the contact lens, wherein the peripheral molding zone defines the one or more non-optical zones on the anterior surface of the contact lens. A bonnet prepared from such a mold has one optically finished surface corresponding to the posterior surface of the contact lens and one surface having an optically finished zone corresponding to the one or more substantially annular non-optical zones surrounding the central optical zone of the contact lens. One only needs to lathe surface areas, surrounded by the optically-finished zone on the side opposite to the optically-finished surface, of the bonnet, thereby obtaining the contact lens. It is understood that such lens can be made by two-side lathing.

In a preferred embodiment, an ophthalmic device of the invention has a hydrophilic surface obtained by using a surface modification process. The hydrophilic surface refers to a surface having an averaged contact angle of 85 degrees or less when the ophthalmic device is fully hydrated. Preferably, the hydrophilic surface is a plasma coating or an LbL coating. Alternatively, a hydrophilic surface can be obtained by incorporating leachable (non-crosslinkable) hydrophilic polymer into the polymerizable fluid composition for making rods or buttons or bonnets.

An "average contact angle" refers to a contact angle of water on a surface of a material (measured by Sessile Drop method), which is obtained by averaging measurements of at least 3 individual samples (e.g., contact lenses). Average contact angles (Sessile Drop) of contact lenses can be measured using a VCA 2500 XE contact angle measurement device from AST, Inc., located in Boston, Mass. This equipment is capable of measuring advancing or receding contact angles or sessile (static) contact angles. The measurements are preferably performed on fully hydrated materials.

Contact angle is a general measure of the surface hydrophilicity of a contact lens or an article (e.g., the cavity surface of a container). In particular, a low contact angle (when the drop is hydrophilic, e.g. water) corresponds to more hydrophilic surface.

In a preferred embodiment, the antimicrobial ophthalmic device comprises at least 10 ppm, preferably at least 25 ppm, more preferably at least 40 ppm, even more preferably at least 60 ppm silver nanoparticles distributed therein.

The present invention, in still a further aspect, provides a method for cast-molding of contact lenses. The method of the invention comprises: obtaining a polymerizable fluid composition including one or more polymerizable components, a free radical initiator, and an organonitroxide, wherein the polymerizable components are selected from the group consisting of a vinylic monomer, a macromer having one or more ethylenically unsaturated groups, a prepolymer with ethylenically unsaturated groups, and mixtures thereof, wherein ratio of percentage by weight of the organonitroxide to the free radical initiator in the polymerizable fluid composition is selected to enable the polymerization fluid composition to be cured at an elevated temperature to obtain a polymer material having a good quality and a reduced polymerization shrinkage; introducing the polymerizable fluid composition into a mold for making a contact lens; and polymerizing the polymerizable fluid composition in the mold to form a polymer contact lens.

Preferably, this casting method is for making silicone hydrogel contact lenses. Above described various embodiments and preferred embodiments of a polymerizable fluid composition and a method for making a silicone hydrogel material of the invention can be used in this aspect of the invention.

Methods of forming mold sections for cast-molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a contact lens mold.

In general, a mold comprises at least two mold sections (or portions) or mold halves, i.e. first and second mold halves. The first mold half defines a first optical surface and the second mold half defines a second optical surface. The first and second mold halves are configured to receive each other such that a contact lens forming cavity is formed between the first optical surface and the second optical surface. The first and second mold halves can be formed through various techniques, such as injection molding. These half sections can later be joined together such that a contact lens-forming cavity is formed therebetween. Thereafter, a contact lens can be formed within the contact lens-forming cavity using various processing techniques, such as ultraviolet curing.

Examples of suitable processes for forming the mold halves are disclosed in U.S. U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, Topas, and PMMA can be used. Other materials that allow UV light transmission could be used, such as quartz glass.

Thermal curing or actinic curing methods can be used to curing a polymerizable composition in a mold to form an ophthalmic lens. Such curing methods are well-known to a person skilled in the art.

In accordance with the invention, ratio of percentage by weight of the organonitroxide to the free radical initiator in the polymerizable fluid composition is selected to provide a polymerization shrinkage of preferably about 10% or less, more preferably about 7% or less, even more preferably about 5% or less, most preferably about 3% or less.

The previous disclosure will enable one having ordinary skill in the art to practice the invention. In order to better enable the reader to understand specific embodiments and the advantages thereof, reference to the following examples is suggested.

Example 1

Unless otherwise stated, all chemicals are used as received. Differential scan calorimetric (DSC) experiments are carried out in aluminum pans in a nitrogen atmosphere using a TA Instruments 2910 DSC. The instrument is calibrated with indium. Glass tubes used for making rods of silicone hydrogel materials are silanized prior to use. Lenses are extracted with isopropanol (isopropyl alcohol) for at least 4 hours and subjected plasma treatment according to procedures described in published U.S. patent application No. 2002/0025389 to obtain plasma coatings. Oxygen and ion permeability measurements are carried out either with lenses after extraction and plasma coating or with lenses without plasma coating. Non-plasma coated lenses are used for tensile testing and water content measurements. Oxygen permeability is determined using polargraphic method.

Ion Permeability Measurements. The ion permeability of a lens is measured according to procedures described in U.S. Pat. No. 5,760,100 (herein incorporated by reference in its entirety). The values of ion permeability reported in the following examples are relative ionoflux diffusion coefficients (D/D$_{ref}$) in reference to a lens material, Alsacon, as reference material. Alsacon has an ionoflux diffusion coefficient of 0.314×10$^{-3}$ mm$^2$/minute.

Example 2

Synthesis of Siloxane-containing Macromer with Ethylenically Unsaturated Group(s)

51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way is completely colorless and clear. It can be stored in air at room temperature for several months in the absence of light without any change in molecular weight.

Example 3

This example illustrates the effectiveness of high temperature polymer rod production utilizing organonitroxide mediated polymerization.

DMA (192.04 grams), macromer (225.36 grams) prepared in Example 2, TRIS (120.36 grams), styrene (60.29 grams), a free radical initiator (AIBN) (1.5125 grams), and 2,2,6,6-tetramethylpiperidinoxy (0.9980 grams) (TEMPO) are mixed to prepare a solvent free formulation shown in Table 1 for making room temperature lathable silicone hydrogel materials. The above-prepared formulations are sparged with nitrogen and then poured into silanized glass test tubes (about 75 ml of the formulation). Each tube is capped with rubber septa and then underwent degassing cycles as follows. Vacuum is applied to each tube filled with the formulation for several minutes and then pressure is equalized with nitrogen. Such degassing pressure equalization operation is repeated three times.

TABLE 1

| Formulation No. | Macromer* | TRIS | DMA | Styrene | AIBN | TEMPO |
|---|---|---|---|---|---|---|
| 1 | 37.52 | 20.04 | 31.97 | 10.04 | 0.2518 | 0.1662 |

*Prepared in Example 2.

Formulation 1 are thermally cured according to the following thermal curing schedule: (a) at 50° C. for 21 hours (not gel) in an oil bath; (b) at 70° C. for 6 hours (not gel); (c) at 80° C. for 48 hours (gel). The gelled rods are allowed to cool to room temperature and then post cured in a forced air oven, The post curing is performed as follows: 50° C. for 6 hours, then at 75° C. for 6 hours, then finally at 105° C. for 30 hours. One hour ramp times are utilized as temperature was increased during post cure operations. The oven is programmed to cool over 6 hours from the final cure temperature of 105° C. No substantial cracks and voids are observed in obtained rods.

Polymer cut from cured rod is tested for glass transition temperature (Tg) according to DSC analysis at a scan rate of 20° C./minute. T$_g$ of dry polymer is 53-58° C. at the first scan and 52-61° C. at the second scan.

Lens Preparation

Button Generation Process: Polymerized Silicone Hydrogel rods are removed from the glass tubes. After separating the polymer rods from the glass tubes, rods are grinded using a center less grinding machine plus its grinding oil, in order to remove any superficial rod deformity due to its polymerization process and to assure the same rod diameter time after time.

Button Trimming Process: Grinded polymer rods are converted into buttons using button trimming lathes. Each Silicone Hydrogel rod is loaded into the button trimming lathe collet mechanism and four (4) forming carbide tools form the button shape while the spindle rotates at 3000 revolutions per minutes. Silicone Hydrogel buttons are then packed into aluminum bags to avoid any pre-hydration. Button trimming process takes place in an environment condition of up to about 35%, preferably about 20% relative humidity (Rh) at about 72° F.

Mini File generation: The geometry to achieve the lens design is described in a file called mini file. The mini file (.MNI) is a geometric description of the profile to be generated that allows complex geometries to be described with comparatively small files and the time to process these files is relatively small when compared with job files (.JFL). Mini files for silicone Hydrogel are created using Mini File Engine software package. The mini files describe any surface in a reasonable number of zones and is unique for each order.

Lens Lathing: Once the polymer button and mini files have been generated, OPTOFORM lathes (any one of Optoform 40, Optoform 50, and Optoform 80 with or without the Variform or Varimax third axis attachment) plus their off axis conic generators are used to perform the concave or convex lens lathing. Lathing step take place in an environment of 20%±2% Rh with a temperature of 72±2° F. During lathing natural or synthetic control waviness diamond tools are used. Machining speed of lens lathing goes form 2500-10,000 RPM with feed rates that ranges form 10-30 mm/min. During lathing process, a compress air at a dew point of about −60° F. is used for blow off debris for a clean cut. Finished parts are inspected for compliance.

Non-plasma coated and sterilized lenses are tested for modulus and Oxygen permeability. For tensile testing, strain rate of 12 mm/min, gauge length of 6.5 mm, strips (2.90 mm width, and 0.096 mm thickness) are used. All samples are submerged in a saline bath during tensile testing. Lenses are autoclaved prior to testing. Oxygen permeability of lenses are determined according to the method disclosed by Nicolson et al. (U.S. Pat. No. 5,760,100) (herein incorporated by reference in its entirety). A plurality of lenses are tested and averaged oxygen and ion permeabilities are used in testing. The modulus of contact lenses is about 0.91 MPa. The averaged oxygen permeability of lenses is about 66 barres. The averaged ion permeability, relative ionoflux diffusion coefficients ($D/D_{ref}$) in reference to a lens material (Alsacon), is about 1.8.

Example 4

This example illustrates that polymer rod quality depends on the ratio of TEMPO to AIBN in nitroxide mediated copolymerization.

Formulation number 2: DMA (319.05 grams), macromer (380.51 grams) prepared in Example 2, TRIS (200.15 grams), styrene (100.01 grams), a free radical initiator (AIBN) (2.5030 grams), and 2,2,6,6-tetramethylpiperidinoxy (TEMPO) (0.5198 grams) are mixed to prepare solvent free formulation shown in Table 2 for making room temperature lathable silicone hydrogel materials. Formulations 3: DMA (316.45 grams), macromer (380.28 grams) prepared in Example 2, TRIS (200.13 grams), styrene (100.10 grams), a free radical initiator (AIBN) (2.4995 grams), and 2,2,6,6-tetramethylpiperidinoxy (TEMPO) (1.0936 grams) are mixed to prepare solvent free formulation shown in Table 2 for making room temperature lathable silicone hydrogel materials. The above-prepared formulations are sparged with nitrogen and then poured into silanized glass test tubes (about 75 ml of the formulation). Each tube is capped with rubber septa and then underwent degassing cycles as follows. Vacuum is applied to each tube filled with the formulation for several minutes and then pressure is equalized with nitrogen. Such degassing pressure equalization operation is repeated three times.

TABLE 2

| Formulation No. | Macromer* | TRIS | DMA | Styrene | AIBN | TEMPO |
| --- | --- | --- | --- | --- | --- | --- |
| 2 | 37.95 | 19.96 | 31.82 | 9.97 | 0.25 | 0.052 |
| 3 | 38.01 | 20.00 | 31.63 | 10.00 | 0.25 | 0.109 |

*Prepared in Example 2.

Glass tubes are washed, dried and then coated with a 2 weight percent solution of silanizing agent in 98% isopropanol as follows. Tubes are filled with silanizing agent, drained, inverted, placed in a rack and then placed in an oven heated to 125° C. for 24 hours. The silanizing agent used is SR80M methylsiloxane product available from GE silicones (Waterford, N.Y.).

An amount of a formulation is added into the tubes after the above treatment. For curing in nitrogen, samples are de-gassed and then pressurized with nitrogen (until septa bulge) three times before being placed in the cure bath. For cases involving curing in air, the samples are de-gassed and then pressure is equalized by bleeding air into the tubes (three cycles) prior to placing samples in the cure bath.

Samples are cured in an oil bath at 80° C. for 22 hours and then post cured in a forced air oven at 105° C. for 24 hours.

Polymer rod quality is found to depend on the ratio of TEMPO to AIBN. Rods obtained from formulation 2 with a lower ratio (about 0.21) of TEMPO to AIBN have poor quality as judged by extent of cracks. However, polymer rods produced from formulation 3 with a higher ratio (about 0.44) of TEMPO to AIBN have good quality (only a few minor cracks).

Polymer cut from cured rod is tested for glass transition temperature ($T_g$) according to DSC analysis at a scan rate of 20° C./minute. $T_g$ of dry polymer is about 70° C. at the second scan.

Example 5

This example illustrates the effect of TEMPO in the absence of AIBN and also the effect of having a 1:1 ratio of AIBN and TEMPO in a silicone hydrogel formulation.

Formulation number 4: DMA (93.15 grams), macromer (113.01 grams) prepared in Example 2, TRIS (60.20 grams), styrene (30.18 grams), and TEMPO (0.4560 grams) are mixed to prepare solvent free formulations shown in Table 7 for making room temperature lathable silicone hydrogel materials. Formulation number 5: DMA (93.51 grams), macromer (113.28 grams) prepared in Example 2, TRIS (60.06 grams), styrene (30.21 grams) AIBN (0.4560 grams), and TEMPO (0.4560 grams) are mixed to prepare solvent free formulations shown in Table 7 for making room temperature lathable silicone hydrogel materials. The above-prepared formulations are sparged with nitrogen and then poured into silanized glass test tubes (about 75 ml of the formulation). Each tube is capped with rubber septa and then underwent degassing cycles as follows. Vacuum is applied to each tube filled with the formulation for several minutes and then pressure is equalized with nitrogen. Such degassing pressure equalization operation is repeated three times.

TABLE 3

| Formulation No. | Macromer* | TRIS | DMA | Styrene | AIBN | TEMPO |
| --- | --- | --- | --- | --- | --- | --- |
| 4 | 38.05 | 20.27 | 31.36 | 10.16 | 0 | 0.153 |
| 5 | 38.02 | 20.16 | 31.38 | 10.14 | 0.154 | 0.153 |

*Prepared in Example 2.

The above-prepared formulation is thermally cured and post cured according to the following schedule: (a) at 30° C. for 24 hours in an oil bath; (b) at 45° C. for 17 hours in an oil bath; (c) at 55° C. for 24 hours in an oil bath; (d) at 65° C. for 17 hours in an oil bath; (e) at 75° C. for 17 hours in an oil bath; (f) at 85° C. for 18 hours in an oil bath; (f) at 95° C. for 2 hours in an oil bath; (g) at 110° C. for 1 hour in a preheated forced air oven; and (h) at 125° C. for 4 hours in a forced air oven. Samples are subjected to additional heating in a forced air oven as follows: 50° C. for 6 hours, 75° C. for 6 hours, and 105° C. for 30 hours. 60 minute ramp rates are used in the cure oven to reach each cure temperature. A 6 hour cool down ramp is used to cool samples from 125° C. to 30° C. at the end of post curing.

Example 6

This example illustrates the use of 4-hydroxy-TEMPO

Formulations 6: DMA (66.25 grams), macromer (76.50 grams) prepared in Example 2, TRIS (36.10 grams), styrene (21.07 grams), a free radical initiator (AIBN) (0.5145 grams), and 4-hydroxy-TEMPO (0.3027 grams) are mixed to prepare solvent free formulation shown in Table 4 for making room temperature lathable silicone hydrogel materials. The above-prepared formulations are sparged with nitrogen and then poured into silanized glass test tubes (about 75 ml of the formulation). Each tube is capped with rubber septa and then underwent degassing cycles as follows. Vacuum is applied to each tube filled with the formulation for several minutes and then pressure is equalized with nitrogen. Such degassing pressure equalization operation is repeated three times. The tubes were placed in a forced air oven and heated at 90° C. for 24 hours. Polymer rods gelled within this time, but showed extensive cracks.

TABLE 4

| Formulation No. | Macromer* | TRIS | DMA | Styrene | AIBN | 4-hydroxy-TEMPO |
|---|---|---|---|---|---|---|
| 6 | 33.00 | 17.98 | 33.00 | 10.16 | 0.2563 | 0.1508 |

Example 7

Formulations 7: DMA (126.16 grams), macromer (152.15 grams) prepared in Example 2, TRIS (80.43 grams), styrene (40.52 grams), a free radical initiator (AIBN) (0.1.092 grams), and 4-hydroxy-TEMPO (0.4159 grams) are mixed to prepare solvent free formulation shown in Table 4 for making room temperature lathable silicone hydrogel materials. The above-prepared formulation was sparged with nitrogen and then degassed. Formulation was poured into silanized glass test tubes (about 66 grams of the formulation per tube). The tubes used in this experiment were 20 mm×300 mm. Each tube is capped with rubber septa and then underwent degassing cycles as follows. Vacuum is applied to each tube filled with the formulation for several minutes and then pressure is equalized with nitrogen. Such degassing pressure equalization operation is repeated three times. The tubes were placed in a forced air oven and heated at 80° C. for 24 hours (polymer gelled within 16 hours); 105° C. for 24 hours; and 125° C. for 24 hours. Samples were allowed to cool from 105° C. to 30° C. over 6 hours. Some of the polymer rods showed some cracks, but more than ½ of the rod polymer was judged to be usable. If was noticed that minimal shrinkage occurred during polymerization as evidenced by the snug fittings of the polymer rods within the glass tubes at the end of cure.

TABLE 5

| Formulation No. | Macromer* | TRIS | DMA | Styrene | AIBN | 4-hydroxy-TEMPO |
|---|---|---|---|---|---|---|
| 7 | 37.96 | 20.07 | 31.48 | 10.11 | 0.2725 | 0.1038 |

In the absence of AIBN, formulation 4 containing about 0.15% TEMPO does not gel even after heating at 125° C. Formulation 5 containing about 1:1 ratio of TEMPO to AIBN is partly gelled after heating at about 85° C. and is converted to solid polymer. But, the obtained polymer is soft, presumably due to high level of non-converted monomer and due to insufficient amount of free radical initiator present in the formulation.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A method for making silicone-hydrogel contact lenses, comprising steps of:

obtaining a polymerizable fluid composition including a siloxane-containing macromer with ethylenically unsaturated group(s), at least one hydrophilic vinylic monomer, a free radical initiator, and an organonitroxide, wherein ratio of percentage by weight of the organonitroxide to the radical initiator in the polymerizable fluid composition is selected to enable the polymerization fluid composition to be cured at an elevated temperature to form rods which are substantially free of defects including cracks and voids and have consistent properties selected from the group consisting of oxygen permeability, ion permeability, water content, elastic modulus, elongation, and combination thereof, wherein the organonitrioxide is a compound having the formula of

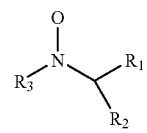

(1)

in which $R_1$ and $R_2$ independently H, an alkyl group, a cycloalkyl group, an arenyl group, a heterocyclic group, or an aryl group, $R_3$ is an alkyl group, a cycloalkyl group, an arenyl group, a heterocyclic group, or an aryl group, $R_3$ and $R_2$ or $R_1$ and $R_2$ may be joined together to form a cyclic ring structure that may have fused with it another saturated or aromatic ring, each of $R_1$, $R_2$, or $R_3$ may be substituted by at least one member of the group consisting of hydroxyl group, sulfonate group, sulfate group, carboxylate group, amino group, ammonium group, alkoxy group, aryloxy group, silyl group, boryl group, phosphino group, thio group, seleno group, and combinations thereof;

filling one or more tubes with the polymerizable fluid composition;

curing the polymerizable fluid composition at the elevated temperature in the tubes to form a polymer in a form of rod which is free of cracks and voids;

stripping away the tubes from the polymer; and lathing the polymer to produce the contact lenses having an oxygen permeability of at least about 40 barres, a modulus of about 1.5 MPa or less, and a water content of at least about 15% by weight when fully hydrated.

2. The method of claim 1, wherein the elevated temperature is about 60° C. or above.

3. The method of claim 1, wherein the elevated temperature is about 70° C. or above.

4. The method of claim 2, wherein the ratio of percentage by weight of the organonitroxide to the radical initiator in the polymerizable fluid composition is from about 0.3 to about 1.1.

5. The method of claim 1, wherein the radical initiator is present in an amount of from about 0.1% to about 1% by weight.

6. A method for cast-molding of contact lenses comprising:
obtaining a polymerizable fluid composition including one or more polymerizable components, a free radical initiator, and an organonitroxide, wherein the polymerizable components are selected from the group consisting of a vinylic monomer, a macromer having one or more ethylenically unsaturated groups, a prepolymer with ethylenically unsaturated groups, and mixtures thereof, wherein the polymerizable fluid composition comprises at least one siloxane-containing macromer with ethylenically unsaturated group(s) or a silicone-containing vinylic monomer or both, and wherein ratio of percentage by weight of the organonitroxide to the free radical initiator in the polymerizable fluid composition is selected to enable the polymerization fluid composition to be cured at an elevated temperature to form rods which have a reduced polymerization shrinkage and are substantially free of defects including cracks and voids and have consistent properties selected from the group consisting of oxygen permeability, ion permeability, water content, elastic modulus, elongation, and combinations thereof, wherein the contact lens has an oxygen permeability of at least about 40 barres, a modulus of about 1.5 MPa or less, and a water content of at least about 15% by weight when fully hydrated; introducing the polymerizable fluid composition into a mold for making a contact lens; and polymerizing the polymerizable fluid composition in the mold to form a contact lens, wherein the organonitroxide is a compound having the formula of

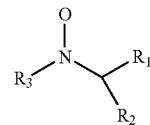

in which R1 and R2 are independently H, an alkyl group, a cycloalkyl group, an arenyl group, a heterocyclic group, or an aryl group; R3 is an alkyl group, a cycloalkyl group, an arenyl group, a heterocyclic group, or an aryl group; R3 and R2 or R1 and R2 may be joined together to form a cyclic ring structure that may have fused with it another saturated or aromatic ring; each of R1, R2, or R3 may be substituted by at least one member of the group consisting of hydroxyl group, sulfonate group, sulfate group, carboxylate group, amino group, ammonium group, alkoxy group, aryloxy group, silyl group, boryl group, phosphino group, thio group, seleno group, and combinations thereof.

* * * * *